UNITED STATES PATENT OFFICE 2,573,676

PROCESS FOR SEPARATING THE ISOMERS OF HEXACHLOROCYCLOHEXANE

Ramsey G. Campbell, Richmond, Calif., assignor to Stauffer Chemical Company, a corporation of California No Drawing. Application September 7, 1948, Serial No. 48,153

2 Claims. (Cl. 260—648)

This invention relates to the manufacture of hexachlorocyclohexane and, more particularly, to the production of hexachlorocyclohexane in which the gamma isomer has been selectively increased to a desired extent.

If benzene is reacted with chlorine under conditions promoting the addition of chlorine but not the substitution of chlorine for hydrogen, then a mixture results of the isomers of hexachlorocyclohexane. So far, five isomers have been identified, the alpha, beta, gamma, delta, and epsilon. It has been recognized heretofore that materials containing the gamma isomer of hexachlorocyclohexane are active insecticides and are useful as pest control materials. For various applications, it is desired to increase the content of the gamma isomer present beyond that concentration in which the gamma isomer is produced by the chlorination operation; in some instances, it is even desired to produce relatively pure gamma isomer of hexachlorocyclohexane.

According to the present invention, a process is provided for treating crude hexachlorocyclohexane to obtain either substantially pure gamma isomer, or else a material containing a concentration of the gamma isomer which is greater than the concentration of this isomer in the material initially.

According to the process of this invention, the hexachlorocyclohexane is extracted with chloroform, the gamma isomer being selectively extracted along with only a relatively small amount of the alpha isomer; the extraction is preferably made with cold chloroform, e. g. at about room temperature, to avoid solution of the alpha isomer. The resulting solution is then evaporated to provide a solution from which the gamma isomer crystallizes readily upon cooling. I have observed that the crystals of the gamma isomer are relatively large while those of the alpha isomer are quite fine, so that, if the mixture of crystals is stirred and then passed through a screen of about 40 mesh, the coarse gamma crystals will be caught on the screen, while the alpha crystals pass through freely.

If the hexachlorocyclohexane is prepared from ordinary benzene or even from that of a "C. P." grade, chlorinated impurities are present which interfere with the gamma isomer crystallization. Also, the delta isomer interferes with the gamma isomer crystallization. For these reasons, it is generally desirable, if it is not essential, first to extract the crude hexachlorocyclohexane with a solvent for the delta isomer, and I have used an aliphatic alcohol such as methyl alcohol, ethyl alcohol, normal propyl alcohol, isopropyl alcohol, n-butyl alcohol and like alcohols to remove the delta isomer and various impurities which carry over from the benzene when this is not of very great purity. Only sufficient of the solvent should be used to remove the delta isomer and impurities as is necessary. Isopropyl alcohol is the preferred solvent, for it has the greatest solubility for the delta isomer and the least solubility for the gamma isomer when they are present in a mixture with one another and with the alpha isomer; by utilizing isopropyl alcohol, the quantity of gamma isomer which goes into solution, along with any given quantity of the delta isomer, is kept to a minimum. Pentane, heptane, hexane can be utilized to separate the chlorinated impurities from the hexachlorocyclohexane, but none of them or benzene is useful in separating the delta and gamma isomers.

As has been pointed out heretofore, the preparation of the hexachlorocyclohexane can affect adversely the crystallization and separation of the gamma isomer. Thus, ordinary benzene, and even benzene of the so-called "C. P." grade, contains contaminants which, when chlorinated, form constituents which interfere with the crystallization of the gamma isomer. It is desirable, therefore, to eliminate these by first chlorinating the benzene with a small amount of chlorine in the presence of light and, in any case, under conditions conducive to substitution chlorination rather than to addition chlorination. Usually the quantity of chlorine required is of the order of from 1% to 2% by weight of the benzene. The amount of chlorine actually required can be readily determined, inasmuch as half of the chlorine added should be evolved as hydrogen chloride. As soon as the quantity of hydrogen chloride evolved is equivalent to less than one-half of the chlorine quantity added, addition chlorination of the benzene is under way and a smaller quantity of chlorine may be employed. A small amount of addition chlorination, however, insures that the contaminants are chlorinated, for these chlorinate first under the conditions favorable to substitution chlorination. The pre-chlorinated benzene is then subject to distillation to remove the chlorinated constituents present. Thereafter, the benzene is chlorinated under conditions favorable to addition chlorination to produce hexachlorocyclohexane. While this will be substantially free of the amorphous-like constituents which interfere with the formation of sharp crystals of the gamma isomer, it will contain the delta isomer which should be first removed. However, less solvent is required and so the risk of loss of the gamma isomer in the delta isomer extraction is reduced.

As illustrative of practice of the present invention, several lots of hexachlorocyclohexane prepared from benzene purified as above were first leached with isopropyl alcohol in the cold to remove impurities. The isopropyl alcohol extraction also served to remove sufficient of the delta isomer present that the gamma isomer crystallized readily as large, well defined crystals. Specifically, each batch of 300 grams of hexachlorocyclohexane, containing 15% of the gamma isomer by weight or 45 grams, was leached with 100 cc. of isopropyl alcohol and thereafter washed with four additional portions of 10 cc. each of isopropyl alcohol. Thirty grams of material were removed by this treatment. One of the remaining solid fractions was then leached with 130 cc. of chloroform at room temperature; the undissolved material was washed with three 30 cc. portions of chloroform. The undissolved alpha and beta fractions weighed 207 grams. The chloroform extract from one batch of hexachlorocyclohexane was then evaporated until the boiling point of the mixture was 70° C., whereupon the solution was cooled to room temperature, 21° C. The gamma and alpha isomers present crystallized; the gamma isomer formed relatively large, coarse crystals, while the alpha isomer crystallized in very fine crystals; when the crystal mixture was passed through a relatively coarse screen, e. g. 40 mesh, the gamma isomer crystals were retained on the screen. This was then washed to free it of adhering mother liquor and mechanically retained alpha crystals; 28 grams of the gamma isomer of hexachlorocyclohexane were thus recovered. This is a yield of 59.8%, since the gamma isomer was of a purity of 96%. The remaining chloroform was evaporated to dryness and 35 grams of benzene hexachloride were recovered containing 41.7% of the gamma isomer; the total recovery was 92.1%.

With another batch of the isopropyl washed material, the cold chloroform extract was evaporated to dryness to provide 63 grams of hexachlorocyclohexane crystals containing 66% of the gamma isomer.

With another batch, the procedure first outlined was followed, and the slurry remaining after removal of the large gamma isomer crystals was passed through a fine screen to separate the crystallized alpha fraction from the chloroform solution, although these can be permitted to remain and then be re-dissolved; these crystals were washed with chloroform and the chloroform wash liquor mixed with the chloroform wash liquor from the washing operation on the large gamma crystals and with the chloroform extract or solution remaining after removal of the fine alpha isomer crystals. The chloroform solution was then evaporated until the boiling point was raised to 70° C. The mixture was then permitted to cool, whereupon another crop of crystals of the gamma isomer separated out. These were then washed with the chloroform; the remaining solution was handled as has been indicated, that is, the fine alpha isomer crystals were removed on a screen and the remaining solution again evaporated; in this manner, it is possible to effect a substantially complete recovery of the gamma isomer.

A kilogram of crude hexachlorocyclohexane containing 20% gamma isomer and containing the delta isomer and chlorinated impurities was slurried with 200 grams of isopropyl alcohol at room temperature. The slurry was extremely thick at first but thinned out considerably in about fifteen minutes. The slurry was vacuum filtered and washed with two 50 cc. portions of fresh isopropyl alcohol. The total volume of the recovered isopropyl alcohol fraction was 335 cc.; it weighed 348 grams. Upon evaporating the isopropyl alcohol from this fraction, 169 grams of material were recovered. This crystallized at once to yield 53 grams of solids after washing the fraction with three 50 cc. portions of cold n-hexane. This material contained 10.0% gamma isomer.

The solids which had not been dissolved by the isopropyl alcohol were slurried with 500 cc. of chloroform at room temperature for fifteen minutes and then vacuum filtered. The solids were washed with three 50 cc. portions of fresh chloroform. The undissolved solids had a dry weight of 581 grams and contained 1.45% of the gamma isomer. This amounted to 8.4 grams of the gamma isomer or a total loss of 4.2% of the original gamma isomer content.

Upon concentrating the chloroform liquor to a boiling point of 70° C. and allowing crystallization to take place for eighteen hours without evaporation or agitation, there were obtained 72 grams of gamma crystals of 96% purity and of such a size that they were retained on a 20 mesh screen when the liquor was poured onto the screen. Without removing any of the fine solids, the liquor was concentrated to a boiling point of 72° C. Crystallization overnight yielded an additional 50 grams of gamma crystals of 95% purity. The remaining liquor, containing residual gamma isomer, was evaporated to dryness. This dry residue contained 34.7% of the gamma isomer.

I claim:

1. A process for treating crude hexachlorocyclohexane which is substantially free of the delta isomer to obtain a fraction containing an enhanced proportion of the gamma isomer comprising dissolving the gamma isomer in the hexachlorocyclohexane with chloroform, heating the chloroform solution to evaporate chloroform and increase the concentration of the gamma isomer, cooling the resulting solution under quiescent conditions to precipitate simultaneously relatively fine small crystals of the alpha isomer and relatively large massive crystals of the gamma isomer, and screening the crystals to separate the crystals of one isomer from the crystals of the other isomer.

2. A process for treating crude hexachlorocyclohexane substantially free of the delta isomer to obtain a fraction containing an enhanced proportion of the gamma isomer comprising dissolving the gamma isomer in the hexachlorocyclohexane with chloroform, heating the chloroform solution to evaporate chloroform and increase the concentration of the gamma isomer, cooling the resulting solution under quiescent conditions to precipitate simultaneously relatively small fine crystals of the alpha isomer and relatively coarse and massive crystals of the gamma isomer, and screening the crystals to separate the crystals of one isomer from the crystals of the other isomer.

RAMSEY G. CAMPBELL.

(References on following page)

References Cited

The following references are of record in the file of this patent:

UNITED STATES PATENTS

| Number | Name | Date |
|---|---|---|
| 2,438,900 | Cooke et al. | Apr. 6, 1948 |

FOREIGN PATENTS

| Number | Country | Date |
|---|---|---|
| 440,691 | Great Britain | Jan. 3, 1936 |
| 447,058 | Great Britain | May 7, 1936 |
| 471,941 | Belgium | Apr. 1947 |
| 573,693 | Great Britain | Dec. 3, 1945 |

OTHER REFERENCES

Slade: "Chemistry and Industry," 1945, pages 315–316.

Fieser: "Experiments in Organic Chemistry," pages 33–9 (1935).